United States Patent
Cheng et al.

(10) Patent No.: US 9,767,028 B2
(45) Date of Patent: Sep. 19, 2017

(54) IN-MEMORY INTERCONNECT PROTOCOL CONFIGURATION REGISTERS

(71) Applicant: Advanced Micro Devices, Inc., Sunnyvale, CA (US)

(72) Inventors: Kevin Y. Cheng, Austin, TX (US); David A. Roberts, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/928,981

(22) Filed: Oct. 30, 2015

(65) Prior Publication Data

US 2017/0123987 A1    May 4, 2017

(51) Int. Cl.
G06F 12/00      (2006.01)
G06F 12/0862    (2016.01)
G06F 13/42      (2006.01)

(52) U.S. Cl.
CPC .......... *G06F 12/0862* (2013.01); *G06F 13/42* (2013.01); *G06F 2212/45* (2013.01)

(58) Field of Classification Search
CPC .............................. G06F 12/00; G06F 12/0215
USPC ................................. 711/100, 137, 154, 200
See application file for complete search history.

(56) References Cited

U.S. PATENT DOCUMENTS

| | | | |
|---|---|---|---|
| 7,185,150 B1 * | 2/2007 | Kogge | G06F 9/5016 711/100 |
| 2003/0041138 A1 * | 2/2003 | Kampe | H04L 12/2602 709/223 |
| 2003/0191739 A1 * | 10/2003 | Chatterjee | G06F 17/3056 |
| 2006/0294323 A1 * | 12/2006 | Armstrong | G06F 9/5077 711/153 |
| 2006/0294337 A1 * | 12/2006 | Hartung | G06F 3/0607 711/173 |

(Continued)

OTHER PUBLICATIONS

Loh, et al., "A Processing-in-Memory Taxonomy and a Case for Studying Fixed-function PIM", In Near-Data Processing Workshop, 2013, 4 pages, http://www.cs.utah.edu/wondp/wondp2013-paper2-final.pdf. [Retrieved Dec. 17, 2015].

*Primary Examiner* — Tuan Thai
(74) *Attorney, Agent, or Firm* — Rory D. Rankin; Meyertons, Hood, Kivlin, Kowert & Goetzel, P.C.

(57) ABSTRACT

Systems, apparatuses, and methods for moving the interconnect protocol configuration registers into the main memory space of a node. The region of memory used for storing the interconnect protocol configuration registers may also be made cacheable to reduce the latency of accesses to the interconnect protocol configuration registers. Interconnect protocol configuration registers which are used during a startup routine may be prefetched into the host's cache to make the startup routine more efficient. The interconnect protocol configuration registers for various interconnect protocols may include one or more of device capability tables, memory-side statistics (e.g., to support two-level memory data mapping decisions), advanced memory and interconnect features such as repair resources and routing tables, prefetching hints, error correcting code (ECC) bits, lists of device capabilities, set and store base address, capability, device ID, status, configuration, capabilities, and other settings.

21 Claims, 10 Drawing Sheets

(56) References Cited

U.S. PATENT DOCUMENTS

| | | | | |
|---|---|---|---|---|
| 2012/0005243 | A1* | 1/2012 | Van der Merwe | H04L 41/145 707/812 |
| 2014/0047263 | A1* | 2/2014 | Coatney | G06F 11/2023 714/4.11 |
| 2014/0254591 | A1* | 9/2014 | Mahadevan | H04L 45/16 370/390 |

\* cited by examiner

IN-MEMORY INTERCONNECT PROTOCOL CONFIGURATION REGISTERS

The invention described herein was made with government support under contract number DE-AC52-07NA27344, Subcontract No. B608045 awarded by the United States Department of Energy. The United States Government has certain rights in the invention.

BACKGROUND

Technical Field

Embodiments described herein relate to data processing devices and more particularly, to implementing interconnect protocol configuration registers in memory.

Description of the Related Art

Computer systems are incorporating more complex memory devices, as well as large numbers and diverse types of memory devices, to cope with ever increasing data storage and performance requirements. One type of computer system may include a hybrid memory cube (HMC) of stacked memory dies, while other types of computer systems using other types of memory devices are also contemplated. Various types of memory devices may be utilized in these computer systems, including random-access memory (RAM), static RAM (SRAM), dynamic RAM (DRAM), high-speed complementary metal-oxide semiconductor (CMOS), high-density DRAM, embedded DRAM (eDRAM), 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

Computer systems often utilize one or more interconnects to enable communication between system components, such as between processors and memory. Interconnects can also be used to support connections to input/output (I/O) devices. Various types of interconnect protocols are currently in use today to support data transfer over different types of interconnects, and new interconnect protocols are continuously being developed and introduced into the marketplace. Interconnect protocols typically require some amount of dedicated register space for use as configuration registers. These configuration registers may be used by the physical/transport layer to set and store base address, capability, status, and other settings. Accordingly, interconnect protocols typically utilize extra physical hardware (e.g., static random-access memory (SRAM)) on interconnected nodes.

Various interconnects (e.g., Peripheral Component Interconnect Express (PCIe), HyperTransport™ (HT), RapidIO, etc.) can require at least a 4 kilobyte (kB) SRAM memory region for command and configuration registers. Moreover, heterogeneous system architecture (HSA)-compliant systems need to provide a table of HSA agent capabilities, which may be large. Implementing a dedicated register space for interconnect protocol configuration registers reduces the amount of space on the logic die that can be utilized for the processor or memory regions.

SUMMARY

Systems, apparatuses, and methods for allocating interconnect protocol configuration registers in cacheable regions of memory are contemplated.

In one embodiment, a computer system may incorporate one or more processing-in-memory (PIM) nodes, wherein the PIM nodes may features 3D stacked memory with processing and caching capabilities. Depending on the embodiment, various types of interconnect protocols may be used to connect one or more processors to the PIM nodes. These various types of interconnect protocols may reserve a region of memory in each PIM node to use as interconnect protocol configuration register space, wherein the region of memory is made cacheable. This can be useful in reducing physical footprint by eliminating dedicated registers which are typically used to store the configuration registers. Storing the configuration registers in memory also opens up a wide range of additional use cases for private state storage to be used for advanced memory and interconnect features such as repair resources and routing tables. By taking advantage of inherent cache coherence supported by some interconnect protocols, the register space may be made cacheable. This may provide transparent, high-performance access to frequently read data structures such as device capability tables and memory-side statistics (e.g., to support two-level memory data mapping decisions).

In various embodiments, a plurality of configuration registers required by interconnect protocols may be moved into the memory region of the PIM module. This effectively reduces the overall footprint of the interconnect protocol within the PIM module to allow the processor or memory region on the logic die to be bigger. It also enables larger register spaces for complex configuration data (e.g., lists of device capabilities) as well as private metadata visible only to the PIM nodes for prefetching hints, error correcting code (ECC) bits, etc. This allows the interconnect protocol to exploit large amounts of RAM and take up less physical space for registers.

In various embodiments, in order to compensate for the extra latency introduced by pushing registers into higher-latency main memory space, the register space may be cached by the processor (memory-side on-PIM cache or requester-side cache) for fast retrieval time. For registers which are used during startup time, some hardware prefetching may be implemented so that these registers are immediately available on initialization. Since these registers may be cached in the local processor of the PIM node, these registers may also be coherently cached on the host or requesting node if desired. This would reduce interconnect traffic if the register write to the PIM node can be deferred or if an item is read more than once. Similarly, caching frequently accessed node configuration or node-private data will allow a master node to rapidly work with remote PIM node data when the master node makes configuration changes.

In various embodiments, the configuration registers for various interconnect protocols may include one or more of device capability tables, memory-side statistics (e.g., to support two-level memory data mapping decisions), advanced memory and interconnect features such as repair resources and routing tables, prefetching hints, ECC bits, lists of device capabilities, set and store base address, device ID, status, configuration, capabilities, and other settings.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
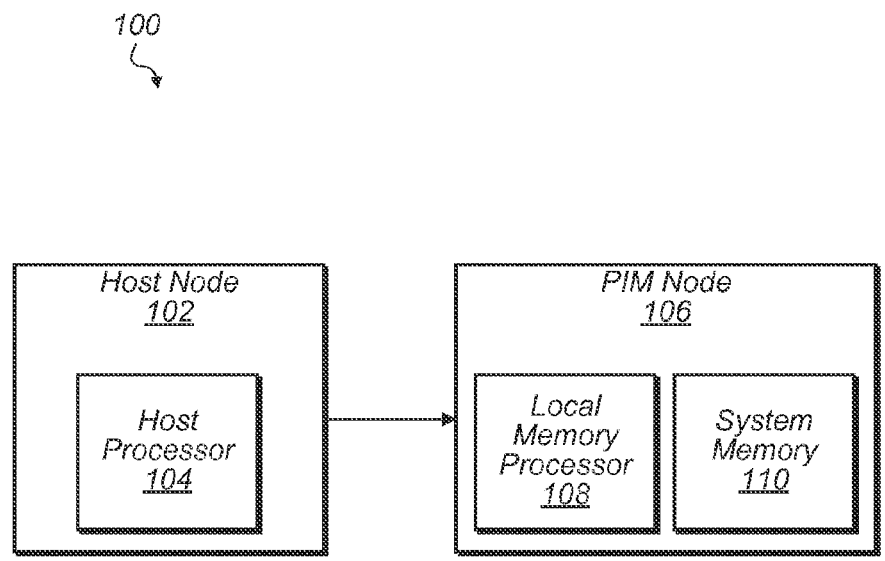
FIG. 1 is a block diagram of one embodiment of a computing system.

Referring now to FIG. 1, a block diagram illustrating one embodiment of a computer system 100 is shown. Computer system 100 includes host node 102 connected to processing-in-memory (PIM) node 106. In other embodiments, host node 102 may be connected to a plurality of PIM nodes. As used herein, a node may be defined as a computing device or computing system with one or more processing elements (e.g., CPU, GPU, programmable logic) and one or more memory devices. Host node 102 may include host processor 104 which may be any type of processor with any number of cores, depending on the embodiment. In one embodiment, host processor 104 may execute the main control software of computer system 100, such as an operating system. Generally, software executed by host processor 104 during use may control the other components of host node 102 to realize the desired functionality of host node 102. Host processor 104 may also execute other software, such as application programs. The application programs may provide user functionality, and may rely on the operating system for lower level device control.

In one embodiment, PIM node 106 may include local memory processor 108 and system memory 110, which is representative of any number and type of memory devices. PIM node 106 may be implemented with a PIM architecture, which is a concept of adding computational capabilities near memory. The benefits of this architecture include reduced latency and energy consumption associated with data-movement between cache and memory hierarchy.

Host node 102 may be coupled to PIM node 106 using any of various types of interconnect protocols. Typical interconnects (e.g., PCIe, HT, RapidIO) can require at least a 4 KB SRAM memory region for command and configuration registers. In one embodiment, PIM node 106 may take advantage of an improved memory interface architecture by reserving a small region of system memory 110 to use as interconnect protocol configuration register space. This can be useful for reducing physical footprint by eliminating SRAM registers typically utilized to store the interconnect protocol configuration register space. Reserving a small region of system memory 110 to use as interconnect protocol configuration register space also opens up a wide range of additional use cases for private state storage to be used for advanced memory and interconnect features such as repair resources and routing tables. Additionally, the interconnect protocol configuration register space of system memory 110 may be made cacheable.

Computer system 100 may correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, storage device, a peripheral device such as a switch, modem, router, etc., or in general any type of computing device.

Figure 2:
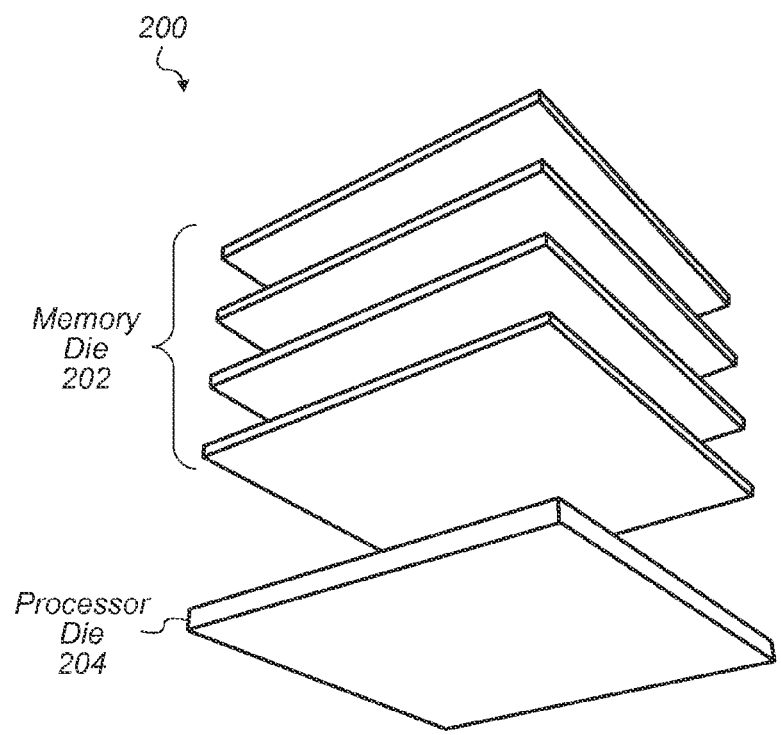
FIG. 2 is a block diagram of one embodiment of a PIM node.

Turning now to FIG. 2, a block diagram of one embodiment of a PIM node 200 is shown. In one embodiment, PIM node 200 may include a vertical die stack of memory die 202 and processor die 204. Memory die 202 comprises a stacked memory device wherein the stacked die implement memory circuitry, such as DRAM, SRAM, ROM, and the like. Processor die 204 may implement hard-wired logic and routing logic for accessing the memory circuitry of the stacked memory die 202. PIM node 200 may be fabricated using any of a variety of 3D integrated circuit fabrication processes.

In one embodiment, processor die 204 and memory die 202 may be implemented as separate substrates (e.g., bulk silicon) with active devices and one or more metal routing layers formed at an active surface. This approach can include a wafer-on-wafer process whereby a wafer comprising a matrix of die is fabricated and thinned, and through-silicon vias (TSVs) are etched through the bulk silicon. Multiple wafers are then stacked to achieve the illustrated layer configuration (e.g., a stack of four wafers comprising memory circuitry die for the four memory layers and a wafer comprising the logic die for the processor layer), aligned, and then joined via thermocompression. The resulting stacked wafer set is singulated to separate the individual 3D IC device. In other embodiments, other techniques for fabricating PIM node 200 may be utilized.

In one embodiment, processor die 204 may include a DRAM memory controller which is coupled to the stacked memory die 202 via TSVs. The memory controller may be configured to perform memory accesses to the data stored in the storage cell circuitry of the stacked DRAM memory devices in response to memory access requests from one or more processor cores or processing elements on processor die 204. It is noted that in other embodiments, other configurations and structures of PIM nodes may be utilized.

Figure 3:
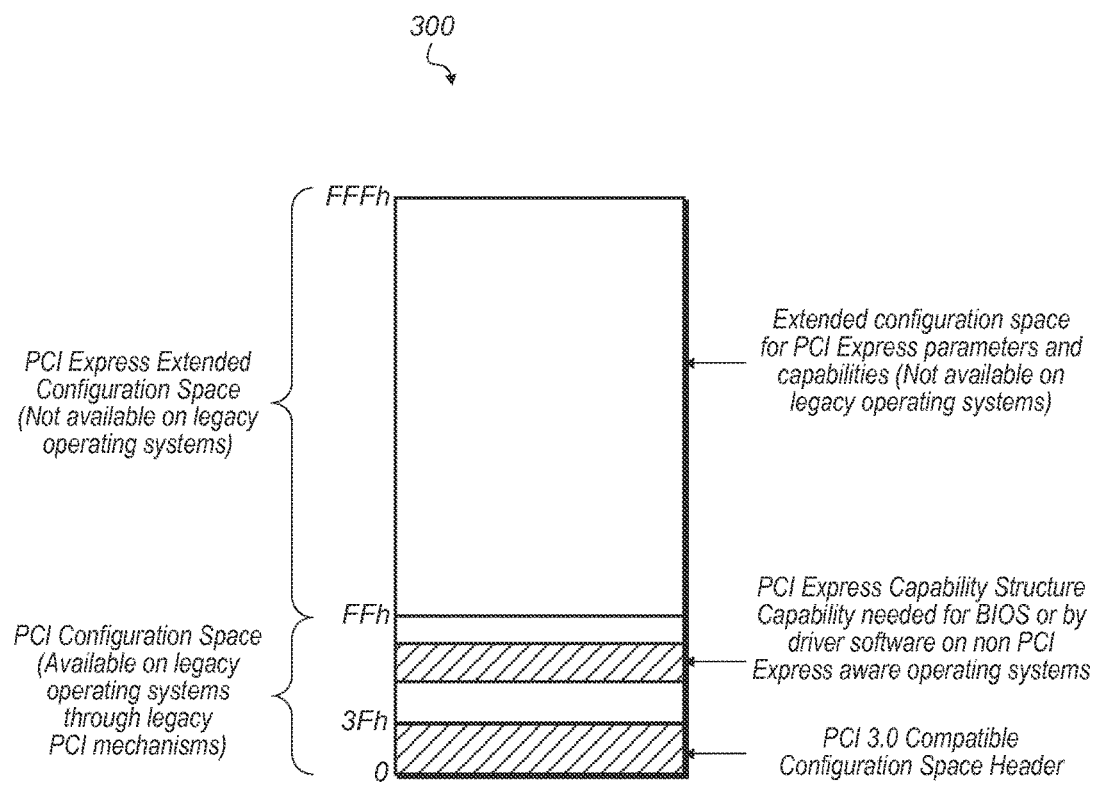
FIG. 3 illustrates a PCIe configuration space layout.

Referring now to FIG. 3, a PCI-Express (PCIe) configuration space layout 300 is shown. Modern day on-chip, off-chip processors are typically connected with some interconnect protocol. An example protocol described here is PCIe. In PCIe, two interconnected nodes are labeled "Root Complex" and "End node." Both ends of the protocol require a register space to store a device's ID, status, configuration, capabilities, etc. PCI-Express specifically mandates 4 KB of register space.

The address 0x0 to 0xFF of PCIe configuration space layout 300 is available on legacy operating systems through legacy PCI mechanisms. PCIe configuration space layout 300 includes a PCI compatible configuration source header from address 0x0 to 0x3F. PCIe configuration space layout 300 also includes a PCI Express capability structure needed for BIOS or by driver software on non PCI express aware operating systems. The address 0xFF to 0xFFF of PCIe configuration space layout 300 is allocated for the PCI extended configuration space which is not available on legacy operating systems. It is noted that the PCIe configuration space layout 300 is merely one example of a configuration space for the PCIe interconnect protocol. The configuration space layouts for other interconnect protocols (e.g., HyperTransport, RapidIO) may vary from according to the interconnect protocol.

Figure 4:
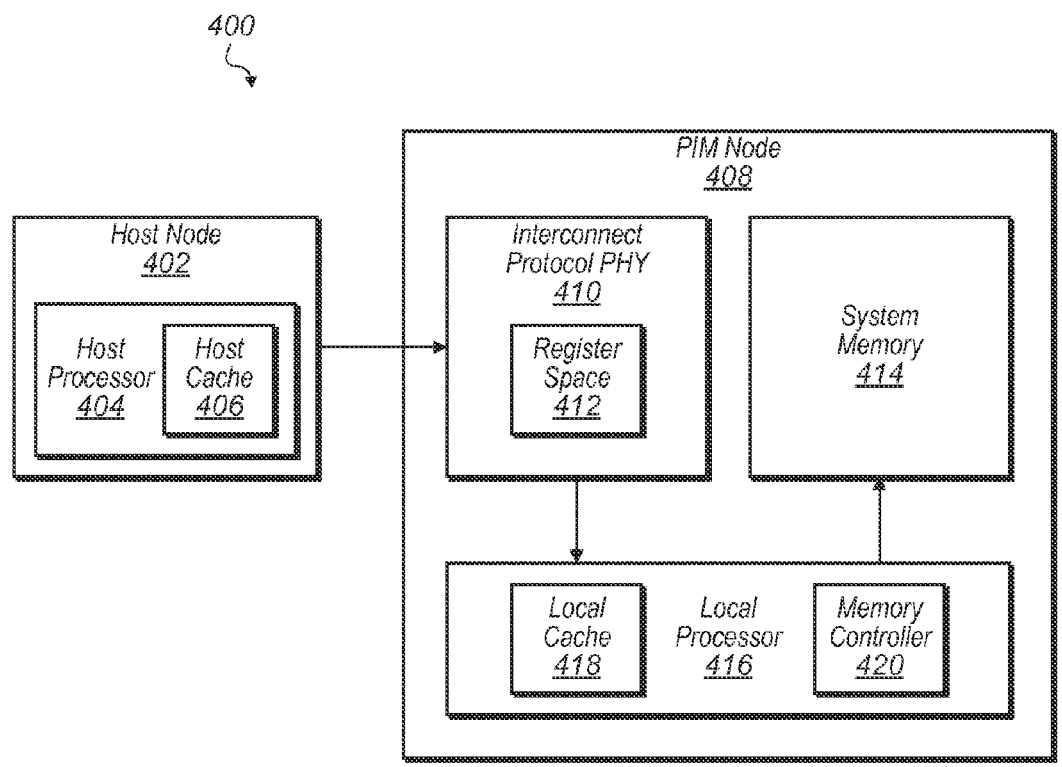
FIG. 4 is a block diagram of one embodiment of a computer system with a host node coupled to a PIM node.

Turning now to FIG. 4, a block diagram of one embodiment of a computer system 400 with a host node 402 coupled to a PIM node 408. Computer system 400 illustrates a traditional configuration with PIM node 408 having a dedicated register space 412 for storing the interconnect protocol configuration registers in the interconnect protocol physical layer (PHY) 410. PIM node 408 may also include local processor 416 and system memory 414, with local processor 416 including local cache 418 and utilizing memory controller 420 for processing memory requests targeting system memory 414.

Host node 402 may include host processor 404 with host cache 406. Host processor 404 is representative of any number and type of processors. Host node 402 is coupled to PIM node 408 and may be coupled to any number of other nodes (not shown). Host node 402 may utilize any type of interconnect protocol for connecting to PIM node 408. For example, interconnect protocols utilized by host node 402 may include Peripheral Component Interconnect Express (PCIe), HyperTransport, RapidIO, or other interconnect protocols, depending on the embodiment. Host node 402 may include a PCIe port or related network connector, depending on the interconnect protocol, for establishing the communication path with PIM node 408.

Figure 5:
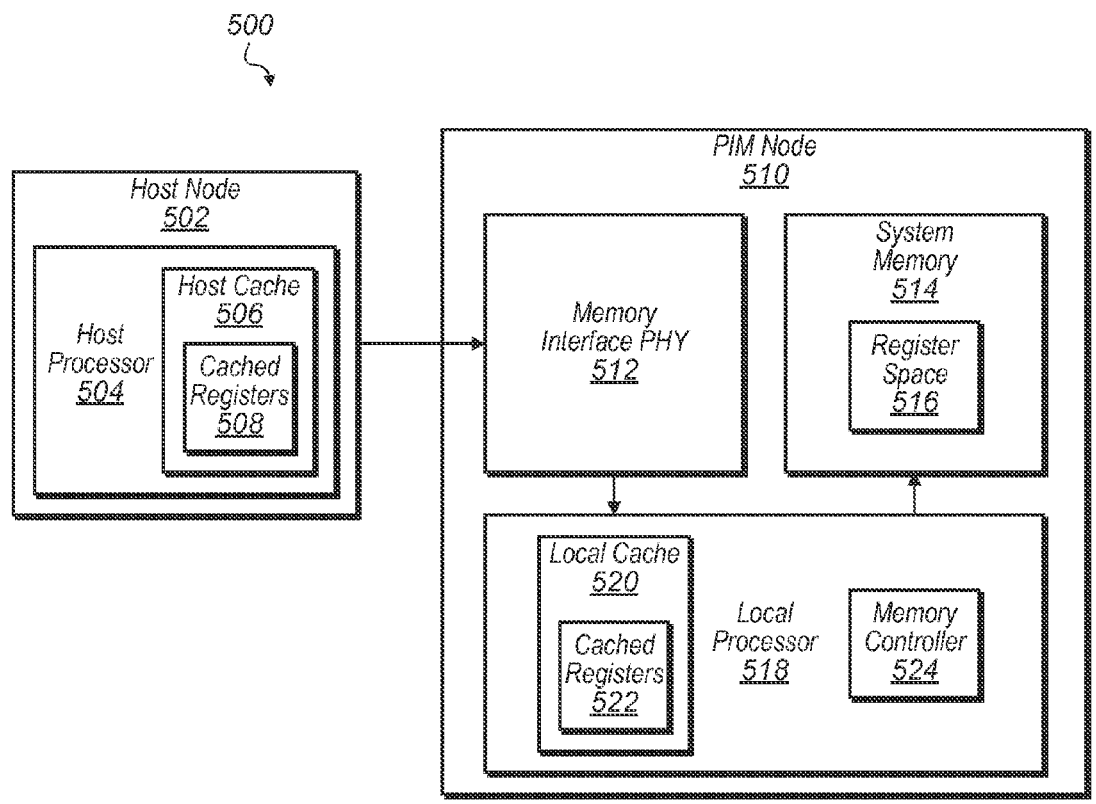
FIG. 5 is a block diagram of one embodiment of a computer system with a host node coupled to a PIM node.

Referring now to FIG. 5, a block diagram of another embodiment of a computer system 500 with a host node 502 coupled to a PIM node 510. Computer system 500 illustrates a new system configuration with PIM node 510 storing the interconnect protocol configuration registers in a first region of system memory 514, wherein the first region is represented by register space 516. Register space 516 may also include various performance registers, memory block access frequency statistics, per-link address frequency counts, prefetching hints, error-correction code (ECC), and/or other data. Since the interconnect protocol configuration registers are stored in system memory 514, PIM node 510 may not have a dedicated register space for storing the interconnect protocol configuration registers. The interconnect protocol configuration registers may also be cached in local cache 520 of local processor 518, wherein the interconnect protocol configuration registers are shown as cached registers 522 in local cache 520. Local processor 518 may utilize memory controller 524 for interfacing to system memory 514. PIM node 510 may also include memory interface PHY 512 which may include transmit and/or receive control logic and decode logic for processing incoming packets or memory requests.

Host node 502 may be coupled to PIM node 510 and depending on the embodiment, host node 502 may utilize any of various types of interconnect protocols for connecting to PIM node 510. Host node 502 may include host processor 504 which is representative of any number and type of processors. Host node 502 may cache interconnect protocol configuration registers in cache 506 for reducing the latency of accesses to these cached registers 508. Cached registers 508 may include a portion or the entirety of the interconnect protocol configuration registers from PIM node 510.

Figure 6:
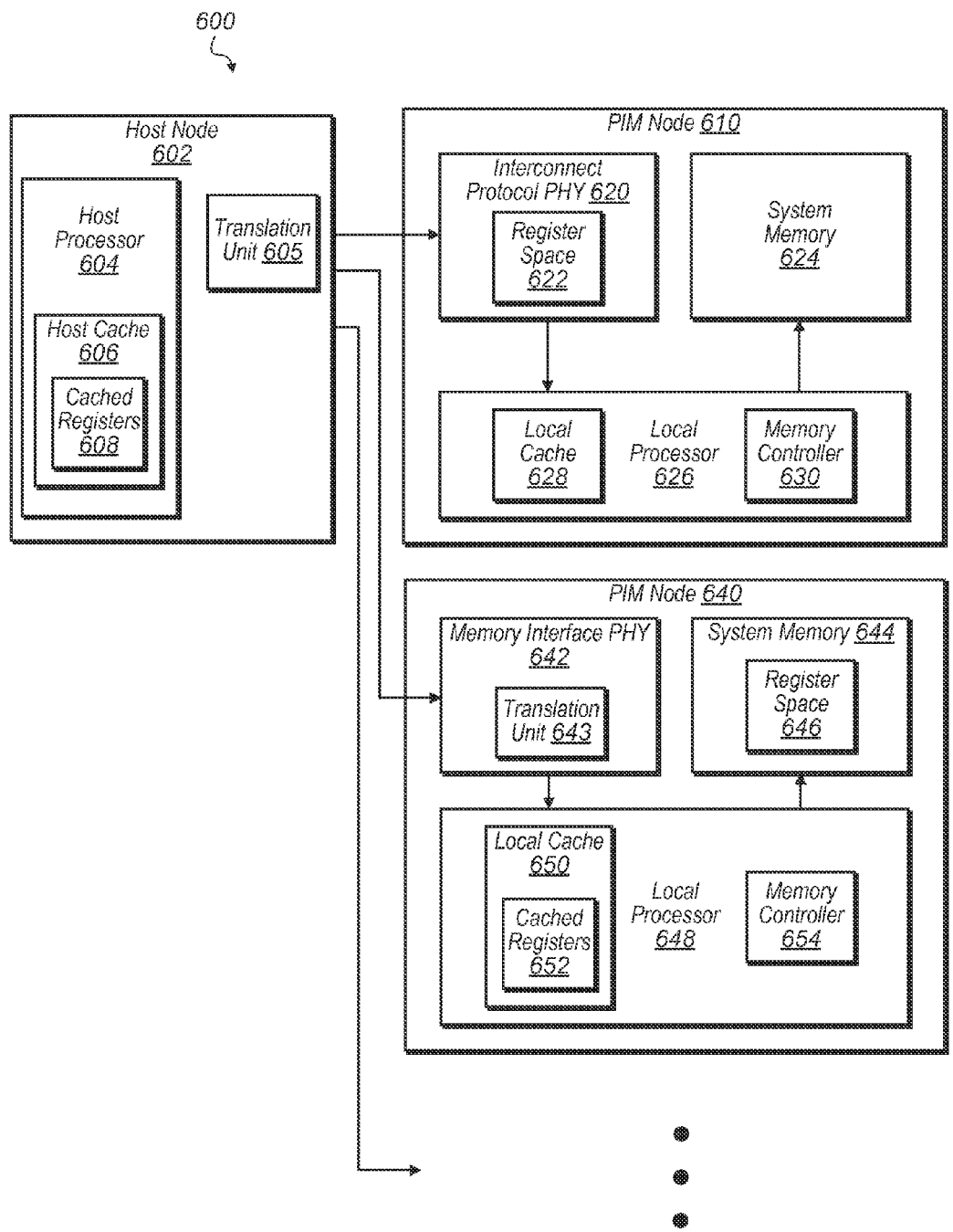
FIG. 6 is a block diagram of one embodiment of a computer system with a host node coupled to a plurality of nodes.

Turning now to FIG. 6, a block diagram of one embodiment of a computer system 600 with a host node 602 coupled to a plurality of nodes. Host node 602 may include host processor 604 which includes host cache 606. Host processor 604 is representative of any number and type of processors. Host node 602 is coupled to PIM nodes 610 and 640 and any number of other nodes (not shown). In some computer systems, the connections between host node 602 and PIM nodes 610 and 640 may be multiplexed and thus share the same set of wires. In other computer systems, the connection between host node 602 and PIM node 610 may use separate wires from the connection between host node 602 and PIM node 640. Additionally, connections between host node 602 and PIM nodes 610 and 640 may be physically routed using switches, routers, crossbars, or other components depending on the embodiment.

Host node 602 may utilize any type of interconnect protocol for connecting to PIM nodes 610 and 640. For example, interconnect protocols utilized by host node 602 may include Peripheral Component Interconnect Express (PCIe), HyperTransport, RapidIO, or other interconnect protocols. In one embodiment, host node 602 may utilize a first interconnect protocol for connecting to PIM node 610 and host node 602 may utilize a second interconnect protocol for connecting to PIM node 640, wherein the first interconnect protocol is different from the second interconnect protocol. In another embodiment, host node 602 may utilize the same interconnect protocol for communicating with both PIM node 610 and PIM node 640.

In one embodiment, host node 602 may include a translation unit 605 for translating requests for given interconnect protocol configuration registers in response to determining that the given interconnect protocol configuration registers are stored in a region of memory rather than in dedicated registers. In another embodiment, requests may be translated in a translation unit in a PIM node, like for example, in translation unit 643 of PIM node 640. In one embodiment, translation unit 605 and/or translation unit 643 may be configured to translate an address of a request to a dedicated register into an address in a given region of main memory space. In other embodiments, translation unit 605 and/or translation unit 643 may be configured to translate an interconnect protocol configuration register request from a first format to a second format, change the priority of a request, and/or perform other changes to the request depending on the target of the request.

PIM node 610 may have a dedicated register space 622 in interconnect protocol PHY 620 for storing the interconnect protocol configuration registers. PIM node 610 may also include local processor 626 and system memory 624, with local processor 626 including local cache 628 and utilizing memory controller 630 for processing memory requests targeting system memory 624. In contrast with PIM node 610, PIM node 640 may not have a dedicated register space for storing interconnect protocol configuration registers. Rather, PIM node 640 may store the interconnect protocol configuration registers (represented by register space 646) in system memory 644. These interconnect protocol configuration registers may also be cached (represented by cached registers 652) in local cache 650 of local processor 648. Local processor 648 may utilize memory controller 654 for interfacing to system memory 644.

When communicating with PIM nodes 610 and 640, host node 602 may differentiate between the PIM nodes based on whether the interconnect protocol configuration registers are stored in a dedicated register space (e.g., PIM node 610) or whether the interconnect protocol configuration registers are stored in a region of main memory space and/or a local cache (e.g., PIM node 640). For example, host node 602 may make the interconnect protocol configuration registers of PIM node 640 cacheable in host cache 606 while not caching interconnect protocol configuration registers of PIM node 610. Cached registers 608 may include a portion or the entirety of interconnect protocol configuration registers from PIM node 640. It is noted that while nodes 610 and 640 are described as being PIM nodes, it should be understood that this is merely an example of one possible implementation. In other embodiments, nodes 610 and 640 may be other types of nodes.

It is noted that while the above embodiments describe systems having dedicated hardware registers and systems using main memory as configuration registers, other embodiments are possible and are contemplated. For example, embodiments are contemplated where some configuration settings (e.g., cache line size, cacheable/uncacheable regions, etc.) affect the way in-memory configuration registers are accessed, which would result in a relatively small set of dedicated registers in the physical layer interface (PHY) and also a list of registers within system memory. In embodiments where the registers may be cached on both the host and PIM sides, coherency protocols (hardware and/or software based) may be used to maintain coherency to ensure valid configuration data is stored at either of the caches.

Figure 7:
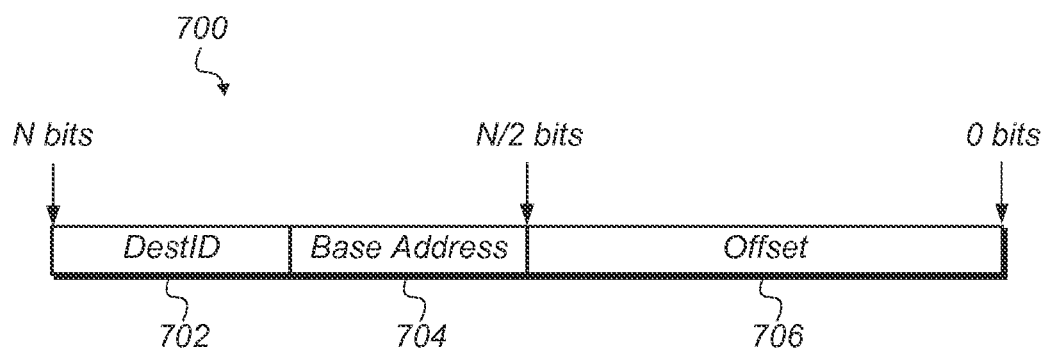
FIG. 7 illustrates a sample transport packet ordering showing base address and offset for accessing registers.

Referring now to FIG. 7, a sample transport packet ordering showing base address and offset for accessing registers is shown. In one embodiment, a host may communicate with a node using packets of the format shown in transport packet 700. Packet 700 may include a destination ID 702 to identify the target node. Packet 700 may also include a base address 704 and an offset 706. The size (N-bits) of packet 700 may vary according to the embodiment. In one embodiment, packet 700 may be 64 bits, while in other embodiments, packet 700 may be other sizes.

In one embodiment, a host may access the register space of a node by some base address 704 up to a limit (as defined in the PHY). The host may then access the adjacent registers of the node through an offset 706. At this point, the host's cache would grab a cache line from the memory of the node and all the adjacent registers would be accessible in the host's cache.

Figure 8:
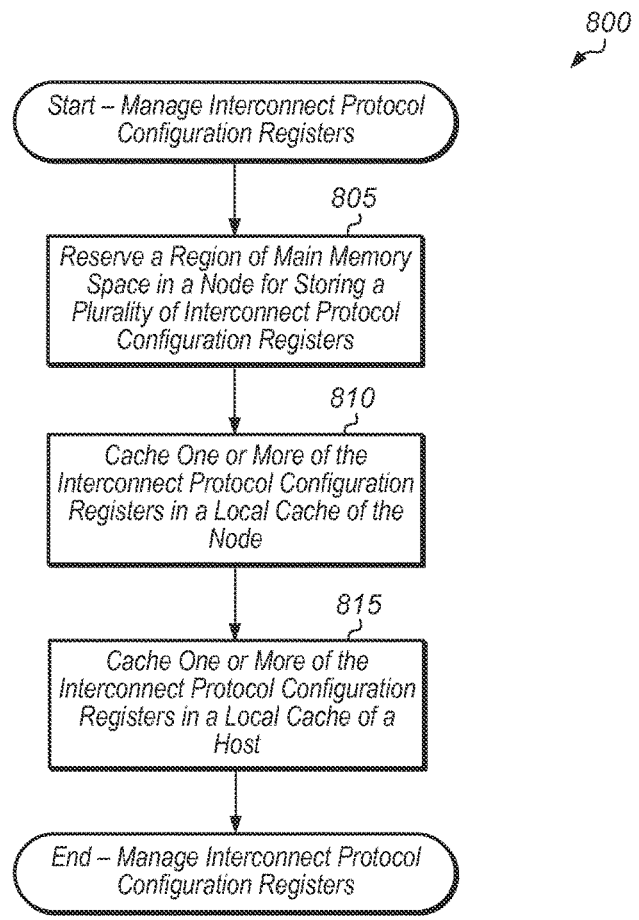
FIG. 8 is a generalized flow diagram illustrating one embodiment of a method for managing interconnect protocol configuration registers.

Turning now to FIG. 8, one embodiment of a method 800 for managing interconnect protocol configuration registers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various nodes, apparatuses, or systems described herein may be configured to implement method 800.

A node may reserve a region of main memory space for storing a plurality of interconnect protocol configuration registers (block 805). In one embodiment, the node may be a PIM node. The node may be coupled to a host and/or to one or more other nodes. The node may cache one or more of the interconnect protocol configuration registers in the node's local cache (block 810). Next, a host coupled to the node may cache the one or more interconnect protocol configuration registers in the host's local cache (block 815). By caching one or more of the interconnect protocol configuration registers, the host may reduce the latency for accessing the interconnect protocol configuration registers. After block 815, method 800 may end.

Figure 9:
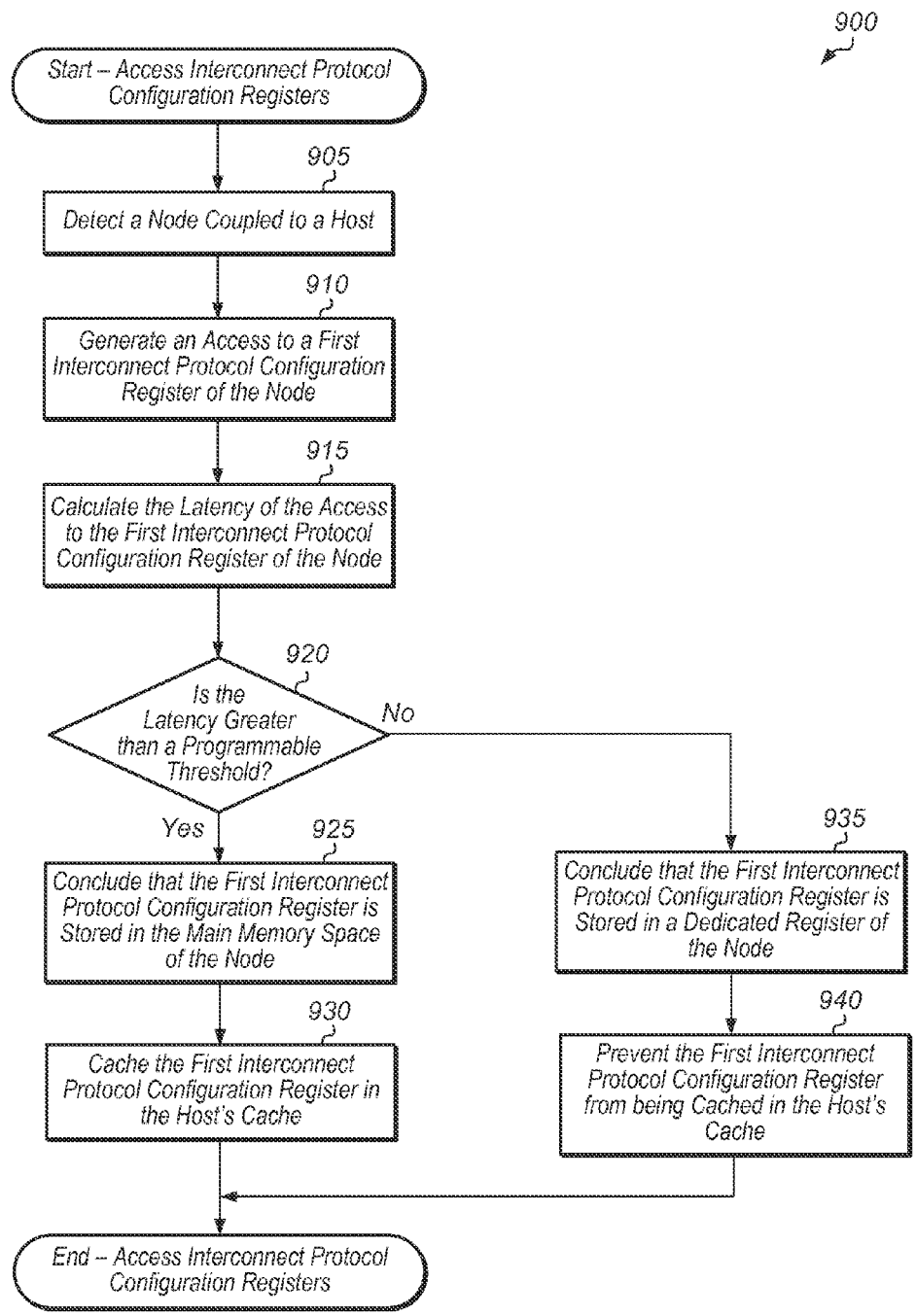
FIG. 9 is a generalized flow diagram illustrating another embodiment of a method for accessing interconnect protocol configuration registers.

Referring now to FIG. 9, one embodiment of a method 900 for accessing interconnect protocol configuration registers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various nodes, apparatuses, or systems described herein may be configured to implement method 900.

A host may detect a node coupled to the host (block 905). In one embodiment, the host may detect the node on startup. In another embodiment, the node may be coupled to the host while the host is already powered up. Next, the host may generate an access to a first interconnect protocol configuration register of the node (block 910). Next, the host may calculate the latency of the access to the first interconnect protocol configuration register of the new node (block 915). The latency may be calculated based on the start time when the access was initiated to the end time when the access was completed or acknowledged by the node. In response to determining the latency is greater than a programmable threshold (conditional block 920, "yes" leg), the host may conclude that the first interconnect protocol configuration register is stored in the main memory space of the node (block 925). The host may also conclude that the other interconnect protocol configuration registers are stored in the main memory space of the node. In one embodiment, the host may store an indicator associated with the node to identify the node as storing interconnect protocol configuration registers in the node's main memory space. In response to concluding that the first interconnect protocol configuration register is stored in the main memory space of the first node, the host may store the first configuration register in a cache of the host (block 930).

In response to determining the latency is less than the programmable threshold (conditional block 920, "no" leg), the host may conclude that the first interconnect protocol configuration register is stored in a dedicated register of the node (block 930). In response to concluding that the first interconnect protocol configuration register is stored in a dedicated register of the node, the host may prevent the first interconnect protocol configuration register from being stored in a cache of the host (block 940). After blocks 935 and 940, method 900 may end.

Figure 10:
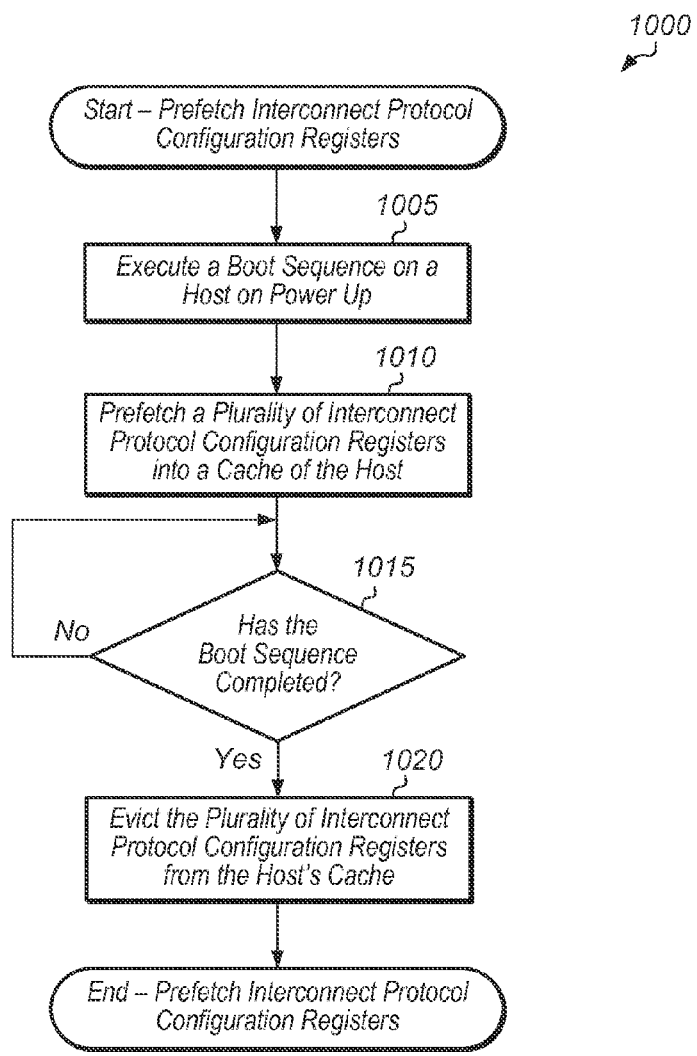
FIG. 10 is a generalized flow diagram illustrating one embodiment of a method for prefetching interconnect protocol configuration registers.

Turning now to FIG. 10, one embodiment of a method 1000 for prefetching interconnect protocol configuration registers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various hosts, apparatuses, or systems described herein may be configured to implement method 1000.

A host may execute a boot sequence on power up (block 1005). The host may be coupled to one or more nodes using one or more interconnect protocols. The one or more interconnect protocols may include PCIe, HyperTransport, RapidIO, Serial ATA, Universal Serial Bus (USB), FireWire, or other interconnect protocols. As part of the boot sequence, the host may prefetch a plurality of interconnect protocol configuration registers into a cache of the host (block 1010). The host may prefetch the interconnect protocol configuration registers which are going to be accessed as part of the startup routine. By prefetching the plurality of interconnect protocol configuration registers, the latency of performing accesses to the plurality of interconnect protocol configuration registers will be reduced. In one embodiment, the host may only prefetch interconnect protocol configuration registers which are stored in the main memory space of the one or more nodes. The host may be connected to one or more other nodes which have their interconnect protocol configuration registers stored in dedicated registers which facilitate fast access. Therefore, in one embodiment, the host may not cache these interconnect protocol configuration registers for other nodes which have the interconnect protocol configuration registers stored in dedicated registers. In one embodiment, the plurality of interconnect protocol configuration registers which are prefetched into the host's cache may include registers from multiple different nodes. In another embodiment, the plurality of interconnect protocol configuration registers which are prefetched into the host's cache may include registers from a single node.

Next, the host may determine if the boot sequence has completed (conditional block 1015). If the boot sequence has completed (conditional block 1015, "yes" leg), then the host may evict the plurality of protocol interconnect configuration settings from the cache (block 1020). If the boot sequence has not completed (conditional block 1015, "no" leg), then method 1000 may remain at conditional block 1015. After block 1020, method 1000 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A method comprising:
storing a plurality of interconnect protocol configuration registers in a main memory space of a first node;
caching the plurality interconnect protocol configuration registers in a cache of the first node;
accessing, by a host node, a first interconnect protocol configuration register of the first node;
calculating a latency of an access to the first interconnect protocol configuration register; and
storing an indicator that the first interconnect protocol configuration register is stored in a dedicated register of the first node responsive to determining the latency is less than a programmable threshold.

2. The method as recited in claim 1, further comprising caching the first interconnect protocol configuration register in a cache of the host node.

3. The method as recited in claim 1, further comprising:
prefetching, by a host node, the first interconnect protocol configuration register of the plurality of interconnect protocol configuration registers during a boot sequence;
caching the first interconnect protocol configuration register in a cache of the host node; and
evicting the first interconnect protocol configuration register from the cache of the host node responsive to completing the boot sequence.

4. The method as recited in claim 1, further comprising storing an indicator that the first interconnect protocol configuration register is stored in the main memory space of the first node responsive to determining the latency is greater than a programmable threshold.

5. The method as recited in claim 4, further comprising:
caching the first interconnect protocol configuration register in the host node responsive to storing an indicator that the first interconnect protocol configuration register is stored in the main memory space of the first node; and
preventing the first interconnect protocol configuration register from being cached in the host node responsive to storing an indicator that the first interconnect protocol configuration register is stored in a dedicated register of the first node.

6. The method as recited in claim 1, wherein the first node is a processing-in-memory (PIM) node.

7. A system comprising:
a first node; and
a host node coupled to the first node;
wherein the first node is configured to:
store a plurality of interconnect protocol configuration registers in a main memory space of a first node;
cache the plurality interconnect protocol configuration registers in a cache of the first node;
access a first interconnect protocol configuration register of the first node;
calculate a latency of an access to the first interconnect protocol configuration register; and
store an indicator that the first interconnect protocol configuration register is stored in a dedicated register of the first node responsive to determining the latency is less than a programmable threshold.

8. The system as recited in claim 7, wherein the host node is configured to
cache the first interconnect protocol configuration register in a cache of the host node.

9. The system as recited in claim 7, wherein the host node is configured to:

prefetch the first interconnect protocol configuration register of the plurality of interconnect protocol configuration registers during a boot sequence;
cache the first interconnect protocol configuration register in a cache of the host node; and
evict the first interconnect protocol configuration register from the cache of the host node responsive to completing the boot sequence.

10. The system as recited in claim 7, wherein the host node is further configured to store an indicator that the first interconnect protocol configuration register is stored in the main memory space of the first node responsive to determining the latency is greater than a programmable threshold.

11. The system as recited in claim 10, wherein the host node is further configured to:
cache the first interconnect protocol configuration register in a cache of the host node responsive to storing an indicator that the first interconnect protocol configuration register is stored in the main memory space of the first node; and
prevent the first interconnect protocol configuration register from being cached in the host node responsive to storing an indicator that the first interconnect protocol configuration register is stored in a dedicated register of the first node.

12. The system as recited in claim 7, wherein the first node is a processing-in-memory (PIM) node.

13. A non-transitory computer readable storage medium storing program instructions, wherein the program instructions are executable by a processor to:
store a plurality of interconnect protocol configuration registers in a main memory space of a first node;
cache the plurality interconnect protocol configuration registers in a cache of the first node;
access, by a host node, a first interconnect protocol configuration register of the first node;
calculate a latency of an access to the first interconnect protocol configuration register; and
store an indicator that the first interconnect protocol configuration register is stored in a dedicated register of the first node responsive to determining the latency is less than a programmable threshold.

14. The non-transitory computer readable storage medium as recited in claim 13, wherein the program instructions are further executable by a processor to
cache the first interconnect protocol configuration register in a cache of the host node.

15. The non-transitory computer readable storage medium as recited in claim 13, wherein the program instructions are further executable by a processor to:
prefetch, by a host node, the first interconnect protocol configuration register of the plurality of interconnect protocol configuration registers during a boot sequence;
cache the first interconnect protocol configuration register in a cache of the host node; and
evict the first interconnect protocol configuration register from the cache of the host node responsive to completing the boot sequence.

16. The non-transitory computer readable storage medium as recited in claim 13, wherein the program instructions are further executable by a processor to store an indicator that the first interconnect protocol configuration register is stored in the main memory space of the first node responsive to determining the latency is greater than a programmable threshold.

17. The non-transitory computer readable storage medium as recited in claim 13, wherein the program instructions are further executable by a processor to:
cache the first interconnect protocol configuration register in the host node responsive to storing an indicator that the first interconnect protocol configuration register is stored in the main memory space of the first node; and
prevent the first interconnect protocol configuration register from being cached in the host node responsive to storing an indicator that the first interconnect protocol configuration register is stored in a dedicated register of the first node.

18. A method comprising:
storing a plurality of interconnect protocol configuration registers in a main memory space of a first node;
caching the plurality interconnect protocol configuration registers in a cache of the first node;
prefetching, by a host node, a first interconnect protocol configuration register of the plurality of interconnect protocol configuration registers during a boot sequence;
caching the first interconnect protocol configuration register in a cache of the host node; and
evicting the first interconnect protocol configuration register from the cache of the host node responsive to completing the boot sequence.

19. A system comprising:
a first node; and
a host node coupled to the first node;
wherein the first node is configured to:
store a plurality of interconnect protocol configuration registers in a main memory space of a first node;
cache the plurality interconnect protocol configuration registers in a cache of the first node;
prefetch a first interconnect protocol configuration register of the plurality of interconnect protocol configuration registers during a boot sequence;
cache the first interconnect protocol configuration register in a cache of the host node; and
evict the first interconnect protocol configuration register from the cache of the host node responsive to completing the boot sequence.

20. A non-transitory computer readable storage medium storing program instructions, wherein the program instructions are executable by a processor to:
store a plurality of interconnect protocol configuration registers in a main memory space of a first node;
cache the plurality interconnect protocol configuration registers in a cache of the first node;
prefetch, by a host node, a first interconnect protocol configuration register of the plurality of interconnect protocol configuration registers during a boot sequence;
cache the first interconnect protocol configuration register in a cache of the host node; and
evict the first interconnect protocol configuration register from the cache of the host node responsive to completing the boot sequence.

21. A system comprising:
a first node; and
a host node coupled to the first node;
wherein the first node is configured to:
store a plurality of interconnect protocol configuration registers in a main memory space of a first node;
cache the plurality interconnect protocol configuration registers in a cache of the first node;

cache a first interconnect protocol configuration register in the host node responsive to storing an indicator that the first interconnect protocol configuration register is stored in the main memory space of the first node; and
prevent the first interconnect protocol configuration register from being cached in the host node responsive to storing an indicator that the first interconnect protocol configuration register is stored in a dedicated register of the first node.

* * * * *